US012292957B2

(12) United States Patent
Cao

(10) Patent No.: US 12,292,957 B2
(45) Date of Patent: May 6, 2025

(54) DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventor: Chen Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 275 days.

(21) Appl. No.: 17/890,142

(22) Filed: Aug. 17, 2022

(65) Prior Publication Data

US 2022/0391489 A1 Dec. 8, 2022

Related U.S. Application Data

(63) Continuation of application No. PCT/CN2021/116198, filed on Sep. 2, 2021.

(30) Foreign Application Priority Data

Sep. 24, 2020 (CN) .......................... 202011019261.X

(51) Int. Cl.
 *G06F 21/44* (2013.01)
 *H04L 9/40* (2022.01)
 *H04W 12/06* (2021.01)

(52) U.S. Cl.
 CPC .......... *G06F 21/44* (2013.01); *H04L 63/0876* (2013.01); *H04W 12/06* (2013.01)

(58) Field of Classification Search
 CPC ... G06F 21/60; H04N 21/2404; G06Q 20/385
 See application file for complete search history.

(56) References Cited

U.S. PATENT DOCUMENTS

| 9,003,556 | B2* | 4/2015 | O'Neill ................... G06F 21/60 |
| | | | 726/28 |
| 2010/0100926 | A1 | 4/2010 | Binding et al. |

(Continued)

FOREIGN PATENT DOCUMENTS

| CN | 102204210 A | 9/2011 |
| CN | 108920342 A | 11/2018 |

(Continued)

OTHER PUBLICATIONS

Tencent Technology, WO, PCT/CN2021/116198, Nov. 17, 2021, 4 pgs.

(Continued)

*Primary Examiner* — Barbara B Anyan
(74) *Attorney, Agent, or Firm* — Morgan, Lewis & Bockius LLP

(57) ABSTRACT

Embodiments of this application provide a data processing method performed by a computer device, where the method includes: obtaining, in response to a login trigger event for a target application at a terminal device, an environment identification parameter used for identifying a running environment of the target application at the terminal device; obtaining, according to the environment identification parameter, a login entry information set related to the target application from an application server, the login entry information set including login entry information of login platforms of at least two operating systems; rendering login entry options of the login platforms of the at least two operating systems according to login entry information in the login entry information set; and returning the rendered login entry options to the terminal device for display in a user interface at the terminal device.

19 Claims, 8 Drawing Sheets

(56) References Cited

U.S. PATENT DOCUMENTS

| | | | |
|---|---|---|---|
| 2012/0018506 A1* | 1/2012 | Hammad | G06Q 20/385 |
| | | | 235/375 |
| 2012/0210344 A1* | 8/2012 | McCoy | H04N 21/2404 |
| | | | 725/93 |
| 2018/0063205 A1 | 3/2018 | French | |
| 2020/0221150 A1 | 7/2020 | Guo | |

FOREIGN PATENT DOCUMENTS

| | | |
|---|---|---|
| CN | 111090431 A | 5/2020 |
| CN | 111565332 A | 8/2020 |
| CN | 112165482 A | 1/2021 |
| JP | 6635631 B1 | 1/2020 |
| JP | 2020017201 A | 1/2020 |
| KR | 20170127330 A | 11/2017 |
| WO | WO 2003001739 A1 | 1/2003 |
| WO | 2015/042547 A1 | 3/2015 |

OTHER PUBLICATIONS

Tencent Technology, IPRP, PCT/CN2021/116198, Mar. 28, 2023, 5 pgs.
Tencent Technology (Shenzhen) Company Limited, Japanese Office Action, JP2022-564311, Oct. 3, 2023, 5 pgs.
Tencent Technology, ISR, PCT/CN2021/116198, Nov. 17, 2021, 2 pgs.
Tencent Technology (Shenzhen) Company Limited, Extended European Search Report and Supplementary Search Report, EP21871241.2, Sep. 5, 2023, 9 pgs.

\* cited by examiner

DATA PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/116198, entitled "DATA PROCESSING METHOD, APPARATUS, COMPUTER DEVICE, AND STORAGE MEDIUM" filed on Sep. 2, 2021, which claims priority to Chinese Patent Application No. 202011019261.X, filed with the State Intellectual Property Office of the People's Republic of China on Sep. 24, 2020, and entitled "DATA PROCESSING METHOD AND APPARATUS, COMPUTER DEVICE, AND MEDIUM", all of which are incorporated herein by reference in their entirety.

FIELD OF THE TECHNOLOGY

This application relates to the field of computer technologies, and in particular, to a data processing method, a data processing apparatus, a computer device, and a computer storage medium.

BACKGROUND OF THE DISCLOSURE

With the development of Internet technologies, various applications (APPs) such as cloud game applications running in cloud servers, ordinary game applications running in terminal devices (such as mobile phones and tablets), and multimedia playback applications have emerged.

When a user intends to use an application (such as a cloud game application), the user usually needs to log in to the application on a device with an application account (such as a game account), so that the device can subsequently obtain historical behavior data (such as cloud game data) of the user about the application based on the application account, and provide the user with a corresponding application service (such as a cloud game service) based on the historical behavior data. Currently, how to enable a user to perform an application login operation more easily has become a research hotspot.

SUMMARY

Embodiments of this application provide a data processing method and apparatus, a computer device, and a storage medium, which can enable a user to select login entries corresponding to different operating systems for application login according to an own requirement, thereby improving the user viscosity of a target application and the login service function of the computer device.

According to an aspect, an embodiment of this application provides a data processing method, performed by a computer device, the method including:
  obtaining, in response to a login trigger event for a target application at a terminal device, an environment identification parameter used for identifying a running environment of the target application at the terminal device;
  obtaining, according to the environment identification parameter, a login entry information set related to the target application from an application server, the login entry information set including login entry information of login platforms of at least two operating systems;
  rendering login entry options of the login platforms of the at least two operating systems according to login entry information in the login entry information set; and
  returning the rendered login entry options to the terminal device for display in a user interface at the terminal device.

According to another aspect, an embodiment of this application provides a data processing apparatus, including:
  an obtaining unit, configured to obtain, in response to a login trigger event for a target application at a terminal device, an environment identification parameter used for identifying a running environment of the target application at the terminal device; obtain, according to the environment identification parameter, a login entry information set related to the target application from an application server, the login entry information set including login entry information of login platforms of at least two operating systems;
  a rendering unit, configured to render login entry options of the login platforms of the at least two operating systems according to login entry information in the login entry information set; and
  a display unit, configured to return the rendered login entry options to the terminal device for display in a user interface at the terminal device.

According to still another aspect, an embodiment of this application provides a computer device, including:
  a processor, adapted to implement one or more instructions; and
  a computer storage medium, storing one or more instructions, the one or more instructions being adapted to be loaded by the processor to perform the above data processing method.

According to still another aspect, an embodiment of this application provides a non-transitory computer storage medium, storing one or more instructions, the one or more instructions being adapted to be loaded by the processor to perform the above data processing method.

According to an aspect, an embodiment of this application provides a computer program product or a computer program. The computer program product or the computer program includes computer instructions, and the computer instructions are stored in a computer-readable storage medium. A processor of a terminal reads the computer instructions from the computer storage medium, and executes the computer instructions, to perform the above data processing method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes technical solutions in the embodiments of this application with reference to the accompanying drawings in the embodiments of this application.

In this embodiment of this application, a target application may be any application, such as a game application, a social application (such as a social interaction application or a content sharing application), a multimedia playback application (such as a video playback application or a music playback application), or a live application. The game application herein may be further divided into an ordinary game application and a cloud game application. The so-called ordinary game application is a game application installed and run on a user terminal, while the cloud game application is a game application installed and run on a cloud game system.

Figure 1A:
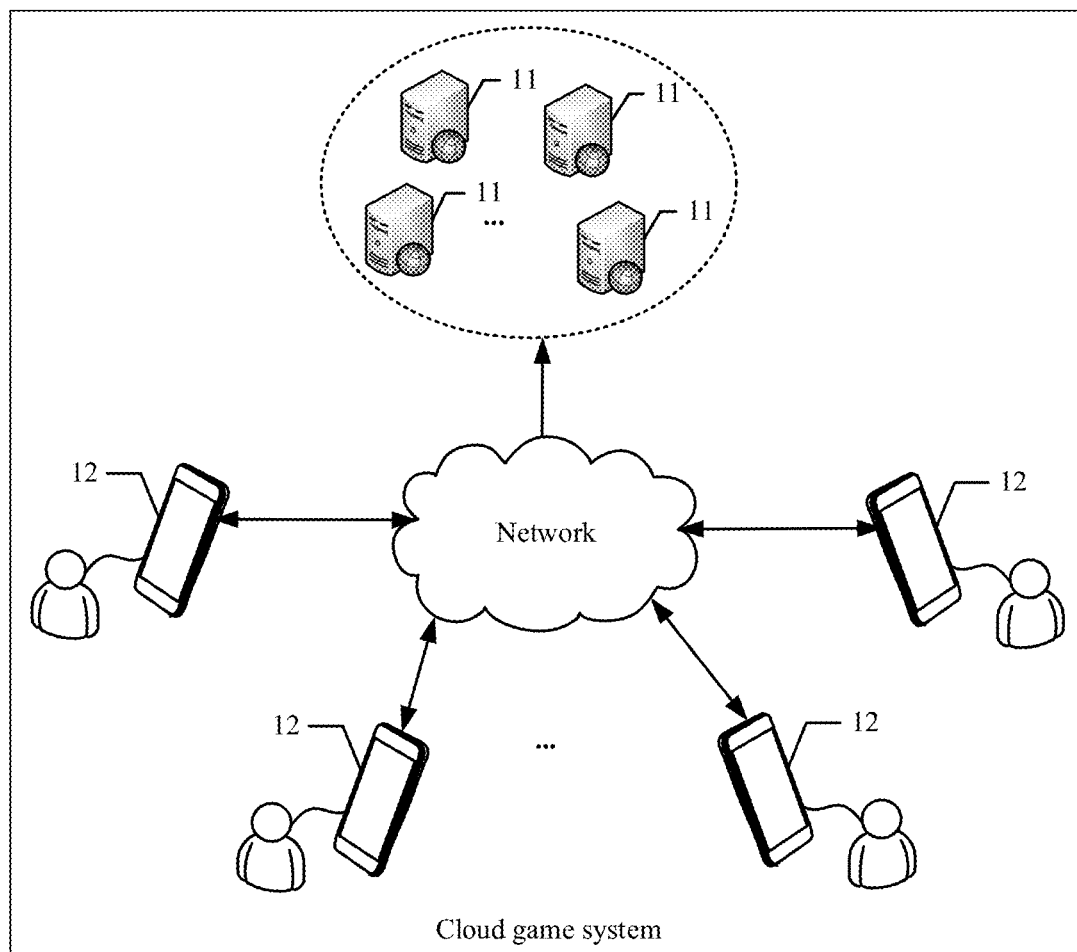
FIG. 1A is a diagram of a system architecture of a cloud game system according to an embodiment of this application.
Figure 1B:
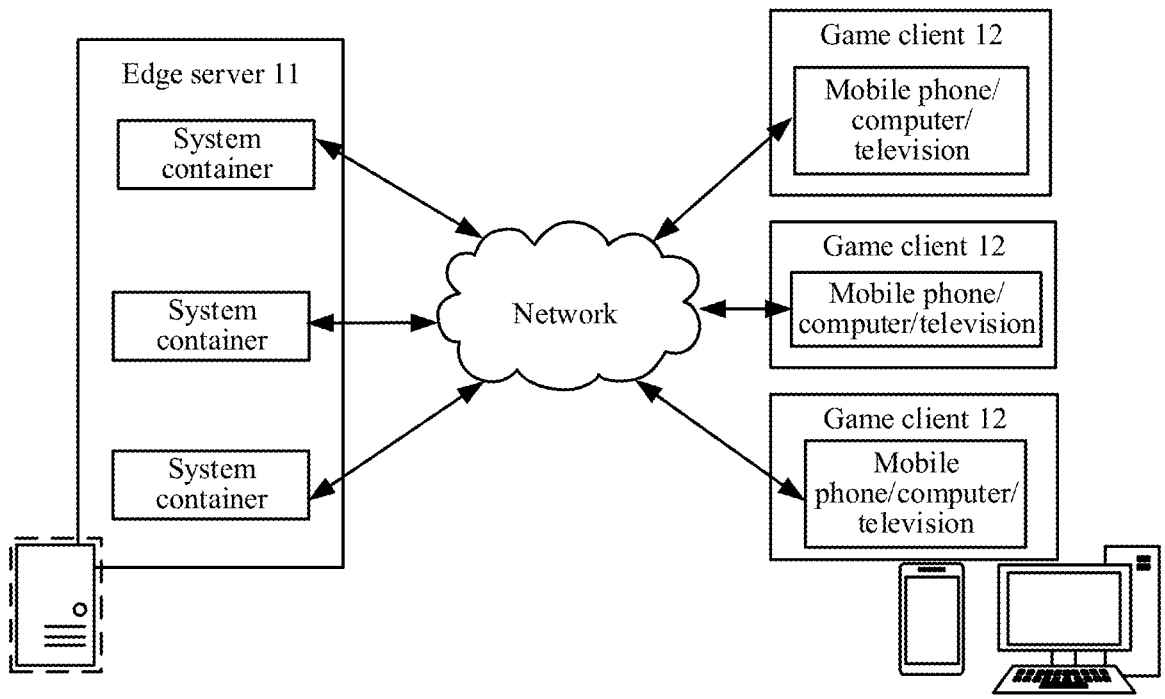
FIG. 1B is a schematic diagram of a connection between an edge server and a plurality of game clients according to an embodiment of this application.

As shown in FIG. 1A, the cloud game system may include at least one edge server 11 and a plurality of game clients 12. The so-called edge server 11 is a server that may be configured to run a system container, that is, at least one system container may be deployed in each edge server 11. Each system container may be connected to a game client 12 in at least one user terminal. As shown in FIG. 1B, the game client may be a mobile phone, a computer, or a television. Moreover, the each system container is configured to run one or more game applications, and in a process of running any game application, the each system container transmits a game picture of the any game application to the game client to which the system container is connected for display. A game provided by the cloud game application may be referred to as a cloud game, and the so-called cloud game may also be referred to as gaming on demand, which is a game manner based on cloud computing. The cloud computing herein is a computing manner based on an Internet.

To enable a user to log in to the target application better, a full platform login system is first provided in this embodiment of this application. The so-called full platform login is a login manner in which the target application is installed and run on a target operating system (such as an Android operating system), but can simultaneously support the user to perform application login (such as Android login and IOS login) through login platforms of at least two operating systems.

The login platforms are platforms that are supported by the target application and the user can perform a login operation for the target application. For example, the target application is set as a game application. If the target application supports the user to perform a login operation for the target application through a social application (such as a WeChat application or a QQ application) in an operating system, the login platform may be a social application in the operating system, such as a social application in the Android system (such as a WeChat application in the Android system or a QQ application in the Android system), or a social application in an IOS system (such as a WeChat application in the IOS system or a QQ application in the IOS system).

Figure 1C:
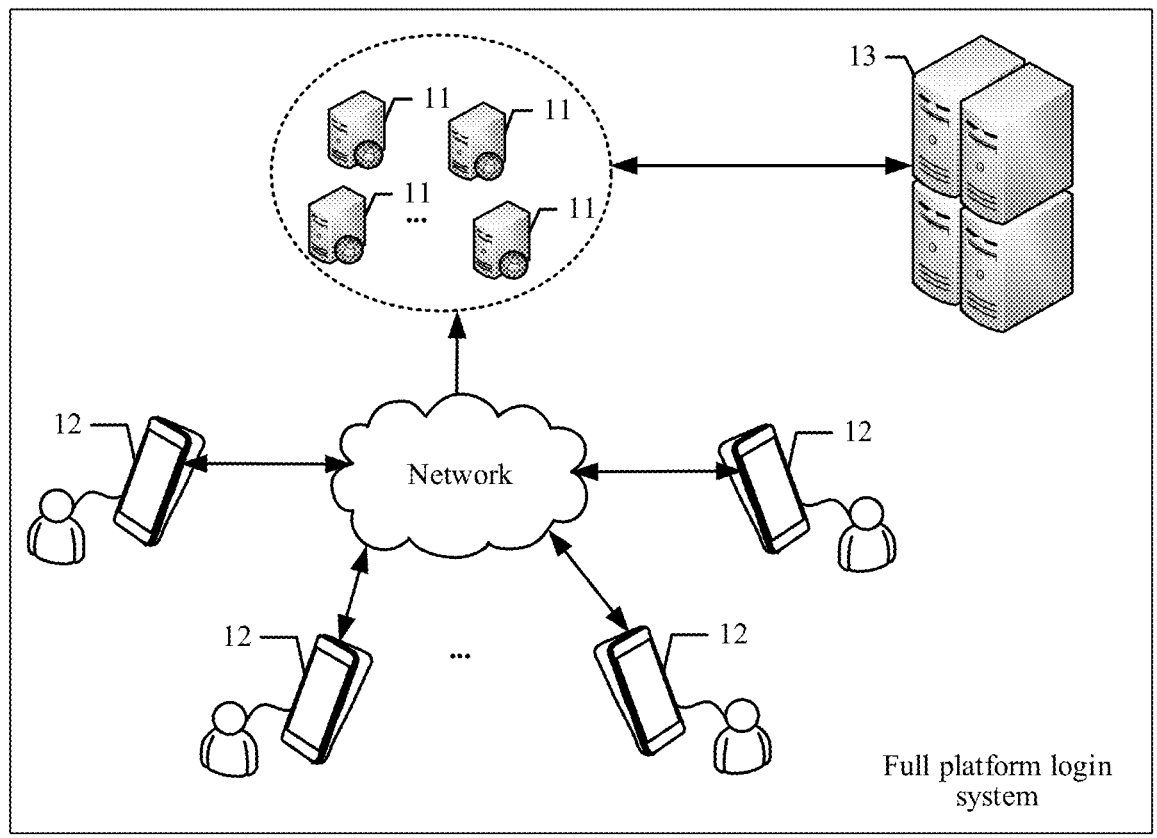
FIG. 1C is a diagram of a system architecture of a full platform login system according to an embodiment of this application.

During specific implementation, the full platform login system may include: an application server 13 configured to support the target application to provide relevant service services, and one or more computer devices 14 on which the target application is installed. When the target application is the cloud game application in the cloud game system, the application server 13 may be a game server configured to support the cloud game application to provide game services (that is, the application server 13 is the game server corresponding to the cloud game application), and the computer device 14 may be any edge server 11 in the cloud game system. In this case, a system architecture of the full platform login system may be shown in FIG. 1C.

When the target application is another application (such as the ordinary game application or the multimedia playback application) except the cloud game application, the application server 13 may be a game server, a media server, or the like; and the computer device 14 may be any terminal device, such as a smartphone, a tablet computer, a notebook computer, a desktop computer, or a smartwatch.

Any server provided in this embodiment of this application may be any independent physical server (such as the edge server or the application server), or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. This is not limited thereto.

Figure 1D:
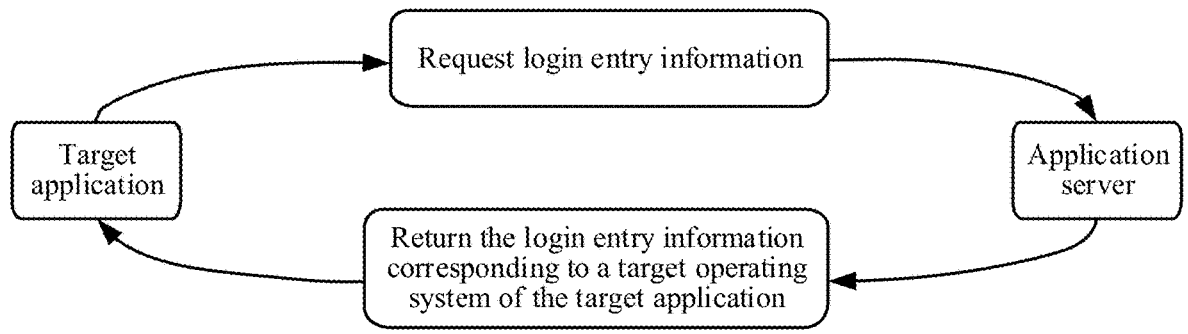
FIG. 1D is a schematic diagram of interaction of obtaining login entry information according to an embodiment of this application.

Based on the above full platform login system and an account login principle, this embodiment of this application provides a full platform login solution, and the full platform login solution may be performed by any computer device in the above full platform login system. The account login principle may be shown in FIG. 1D: when a user intends to log in to a target application, the target application may request login entry information related to a login platform of the target application for an application server. Correspondingly, the application server may return the login entry information of the login platform corresponding to a target operating system of the target application.

For example, the target operating system of the target application is the Android system, and therefore the application server returns login entry information of a login platform corresponding to the Android system. The target operating system of the target application is the IOS system, and therefore the application server returns login entry information of a login platform corresponding to the IOS system. Based on the account login principle, the general principle of the full platform login solution provided in this embodiment of this application is as follows:

By starting from a system bottom layer of the target operating system (such as the Android system) of the target application, and deeply analyzing different policies for identifying a running environment of the target application in the target operating system (such as the Android system), a discrimination feature used (such as an environment identification parameter) for identifying of the running environment of the target application and an environment identification technology for identifying the running environment of the target application based on the discrimination feature are designed and developed.

Figure 1E:
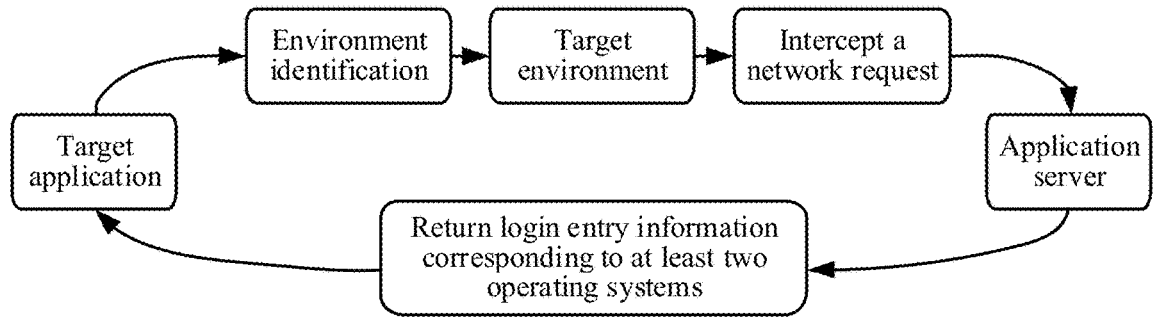
FIG. 1E is a schematic diagram of interaction of obtaining login entry information according to an embodiment of this application.

When the user intends to log in to the target application, a computer device may first identify, by using the environment identification technology, the running environment of the target application according to the discrimination feature (such as the environment identification parameter), and intercept, after identifying that the running environment is a target environment, a network request transmitted by the target application to the application server in a manner of a hook function, and tentatively transmit a hooked request to the application server, to cause the application server to return login entry information of login platforms of a plurality of operating systems, as shown in FIG. 1E.

Alternatively, special login logic for the target application may be set in the application server, so that the application server may identify, by using the environment identification technology after a network request from the target application is received, the running environment of the target application according to the discrimination feature (such as the environment identification parameter), and directly return login entry information of login platforms of a plurality of operating systems after identifying that the running environment is a target environment. After the login entry information of the login platforms of the plurality of operating systems is obtained, the computer device may provide the user with login entries of full platforms based on the login entry information, to enable the user to select login entries corresponding to different operating systems for application login according to an own requirement.

It can be learned that, the full platform login solution provided in this embodiment of this application has the following beneficial effects:

(1) An application login operation of the user is not limited by the target operating system of the target application. The user may select a login entry corresponding to any operating system for application login according to the own requirement, which can effectively improve the user viscosity of the target application.

Particularly, for a user who already has an application account of an associated application related to the target application, the associated application herein is an application that is installed and run on another operating system and provides service services the same as those of the target application. For example, if the target application is a game application that is installed in the Android system and provides relevant services related to a game a, the associated application may be a game application that is installed and run on the IOS system and provides relevant services related to the game a.

By using such a full platform login manner, the user can directly use the application account of the associated application to log in to the target application in the target operating system without re-establishing an application account of the target application, which can effectively realize seamless connection of application accounts. In this way, the target application can continuously provide the user with service services according to historical behavior data (such as historical game data) of the user obtained through the application account of the associated application, thereby effectively realizing exchange of account data, and bringing greater convenience and better application usage experience to the user. Moreover, other users of other operating systems can also be attracted to use the target application, thereby further improving the user viscosity of the target application.

(2) The whole solution is implemented through programming of a standard application programming interface (API) of the operating system, code content is not hard-coded, and transformation logic of the application server does not involve hard coding. The so-called hard coding is a software development practice of directly embedding data into source code of a program or another executable object. Moreover, the code content involved in the whole solution has no policy bound to a specified platform or device. Therefore, the technical implementation of the whole solution can be loosely coupled with the device that executes the solution, and does not need to be executed in a specified platform or device.

That is to say, the full platform login solution provided in this embodiment of this application is applicable to various scenarios such as a terminal device, an operating system simulator (such as an Android simulator), and a cloud game, and has the universality.

In addition, the code content involved in the whole solution has undergone various security checks, and the code content has been subjected to a code review, thereby effectively ensuring the reliability of the scheme implementation. Moreover, the solution does not change service service logic of the target application, and therefore the service content of the target application is not affected.

Figure 2:
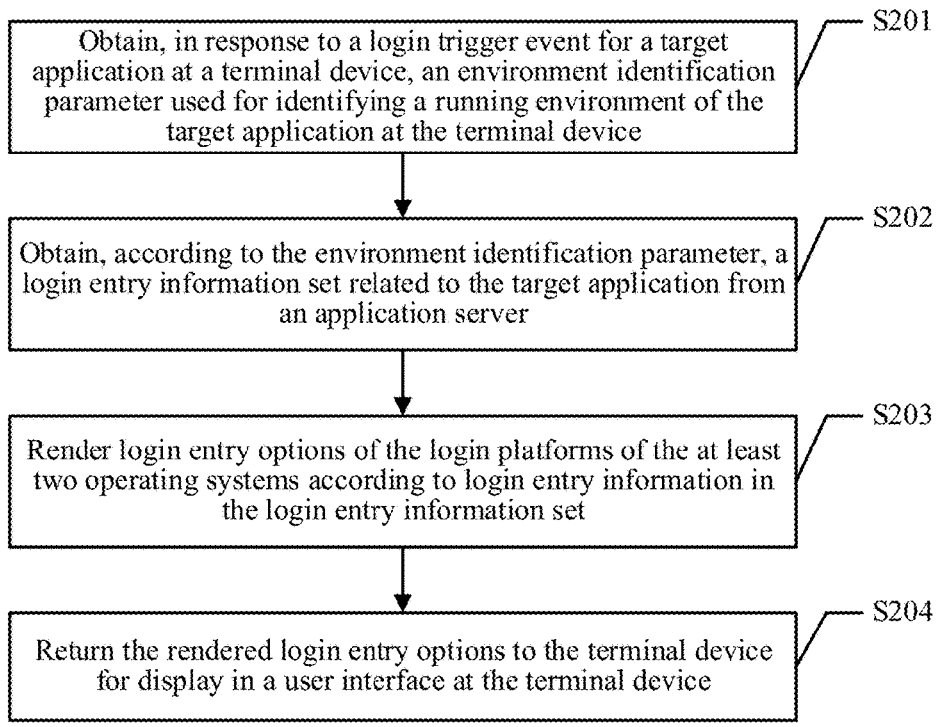
FIG. 2 is a schematic flowchart of a data processing method according to an embodiment of this application.

Based on the relevant description of the above full platform login solution, an embodiment of this application provides a data processing method. The data processing method may be performed by any computer device in the above full platform login system. When a target application is a non-cloud game application, the computer device is a terminal device, for example, the terminal device of the game client 12 in FIG. 1A, FIG. 1B, and FIG. 1C. When the target application is a cloud game application, the computer device may be, for example, the edge server 11 in FIG. 1A, FIG. 1B, and FIG. 1C. Referring to FIG. 2, the data processing method may include the following steps S201 to S204.

S201. Obtain, in response to a login trigger event for a target application at a terminal device, an environment identification parameter used for identifying a running environment of the target application at the terminal device.

It can be learned from the above that, the target application may be a cloud game application in a cloud game system, an ordinary game application, a multimedia playback application, or the like, running at a terminal device (e.g., a mobile phone, a laptop computer or a smart television).

When the target application is the cloud game application in the cloud game system, the target application may be run on a target operating system corresponding to a target container, and the target container is any system container deployed in any edge server in the cloud game system. In this case, the login trigger event may include: an event that a game enabling request transmitted by a target game client connected to the target container is received.

When the target application is the ordinary game application, the multimedia playback application, or another non-cloud game application, the target application may provide a login trigger assembly in an application interface, to enable a user to subsequently perform a login operation. In this case, the login trigger event may include: an event of detecting that the login trigger assembly in the application interface of the target application is triggered, and the like.

When the login trigger event of the target application is detected, the environment identification parameter used for identifying the running environment of the target application may be obtained. Specifically, the environment identification parameter may include at least one of the following: a customized attribute related to the target application, or a system attribute of a target operating system.

The customized attribute is an attribute added in system source code according to product characteristics of the target application; and may include, but is not limited to: an application name of the target application, an application version number, an application data amount (namely, an internal memory amount required by the target application), and an application category to which the target application belongs. The application category herein may include, but is not limited to: a game type, a social type, a video and audio playback type, a news type, and the like. The game type may be further divided into a cloud game type, a mobile game type, and a client game type, and the like. The so-called mobile game is a game run on a mobile terminal device such as a mobile phone or a tablet computer, and the client game is a game run on a terminal device such as a desktop computer.

The system attribute of the target operating system may include, but is not limited to: a device name of a computer device of the target operating system, a baseband name, a version number of an open graphics library used by the target operating system, system compilation information, an international mobile equipment identity code, a device ID, a media access control address, and the like. The target operating system is an operating system on which the target application is installed and run.

S202. Obtain, according to the environment identification parameter, a login entry information set related to the target application from an application server.

The login entry information set is obtained after it is identified that the running environment of the target application is a target environment according to the environment identification parameter. The target environment herein may be set according to actual service requirements, for example, the target environment may be set as a cloud game environment or an Android running environment, or the like.

The login entry information set may include login entry information of login platforms of at least two operating systems. The at least two operating systems may include the target operating system of the target application, or may not include the target operating system. This is not limited thereto. There may be one or more login platforms in each operating system, and login entry information of each login platform is used for indicating that the application server allows to draw login entry options of the login platform. During specific implementation, step S202 may at least include the following two implementations:

In an implementation, the computer device may obtain the login entry information set from the application server by using a manner of hooking a request transmitted by the target application to the application server and transmitting a hooked and modified request to the application server. Specifically, the computer device may identify the running environment of the target application according to the environment identification parameter; and intercept, when an identification result indicates that the running environment is the target environment, a network login request transmitted by the target application to the application server, where the network login request is used for requesting the application server to return login entry information of a login platform of the target operating system. After the network login request is successfully intercepted, the computer device may simultaneously transmit network requests corresponding to the at least two operating systems to the application server, to request the application server to simultaneously return the login entry information of the login platforms of the at least two operating systems; and then receive the login entry information of the login platforms of the at least two operating systems returned by the application server.

In this implementation, by using a manner of intercepting the initial network login request and transmitting the network requests corresponding to the at least two operating systems, the login entry information of the login platforms corresponding to the at least two operating systems is simultaneously obtained from the application server, and there is no need to modify code logic on the application server side, thereby effectively saving processing costs.

In still another implementation, special login logic for the target application may also be set in the application server, to cause the application server to directly return login entry information of login platforms of a plurality of operating systems after identifying that the running environment of the target application is the target environment. Specifically, the computer device may transmit an information obtaining request carrying the environment identification parameter to the application server, to request the application server to identify the running environment of the target application according to the environment identification parameter, and return the login entry information set after an identification result indicates that the running environment is the target environment. Then, the computer device may receive the login entry information set of the returned by the application server.

In this implementation, by using a manner of setting the special login logic in the application server and transmitting the information obtaining request to the application server, the login entry information set is obtained from the application server, and the computer device does not need to simultaneously transmit a plurality of network requests, thereby effectively saving computing resources of the computer device. Moreover, a situation in which the plurality of network requests cannot simultaneously reach the application server due to a network delay, network congestion, or the like so that login entry information corresponding to each operating system cannot be simultaneously obtained can be avoided, thereby effectively improving the obtaining timeliness of the login entry information.

S203. Render login entry options of the login platforms of the at least two operating systems according to login entry information in the login entry information set.

S204. Return the rendered login entry options to the terminal device for display in a user interface at the terminal device.

In steps S203 to S204, rendering instructions used for rendering login entry options of login platforms of operating systems may be obtained by the terminal device according to the login entry information of the login platforms of the operating systems included in the login information set, and the login entry options of the login platforms of the operating systems may be separately rendered according to the obtained rendering instructions. Then, the rendered login entry options are displayed in the user interface at the terminal device.

It can be learned from the above that, when the target application is the non-cloud game application, the computer device is the terminal device. Therefore, in this case, the computer device may directly display the rendered login entry options in the user interface (the application interface of the target application).

When the target application is the cloud game application, the computer device is an edge server in the cloud game system, and the target application is run on a target operating system corresponding to a target container in the edge server. Therefore, in this case, the computer device may transmit the rendered login entry options to a target game client through the target container, to cause the target game client to display the login entry options in the user interface (an application interface of the target game client).

Figure 3:
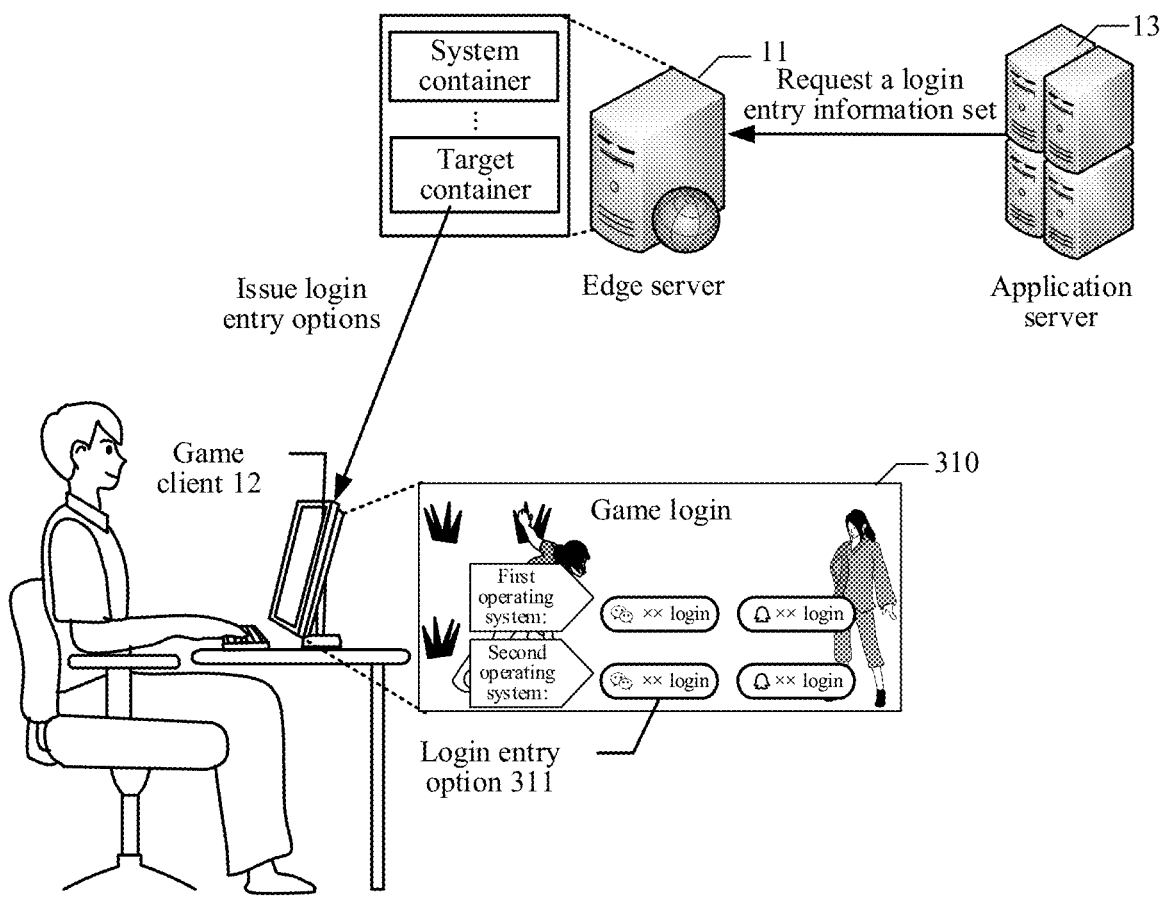
FIG. 3 is a schematic diagram of displaying login entry options of login platforms of at least two operating systems according to an embodiment of this application.

For example, the target application is set as a cloud game application. As shown in FIG. 3, an interface displaying login entry options is shown as 310, and a rendered login entry option 311 includes a plurality of login entry options of a plurality of social applications in a first operating system (such as the Android system) and a second operating system (such as the IOS system), where the social applications respectively include the WeChat application and the QQ application.

In this embodiment of this application, an environment identification parameter used for identifying a running environment of a target application may be obtained in response to a login trigger event for the target application; a login entry information set related to the target application may be obtained from an application server according to the environment identification parameter, where the login entry information set includes login entry information of login platforms of at least two operating systems; and then, a user may be provided with login entry options of the login platforms of the at least two operating systems according to login entry information in the login entry information set. In this way, the user can select login entries corresponding to different operating systems for application login according to an own requirement, thereby improving the user viscosity of the target application. Moreover, because this processing manner can realize that an application login operation of the user is not limited by a target operating system of the target application, other users of other operating systems can also be attracted to use the target application, thereby further improving the user viscosity of the target application. In addition, because the login entry information set is obtained after it is identified that the running environment of the target application is a target environment according to the environment identification parameter, the reliability and security of the login entry information set can also be effectively improved.

Figure 4:
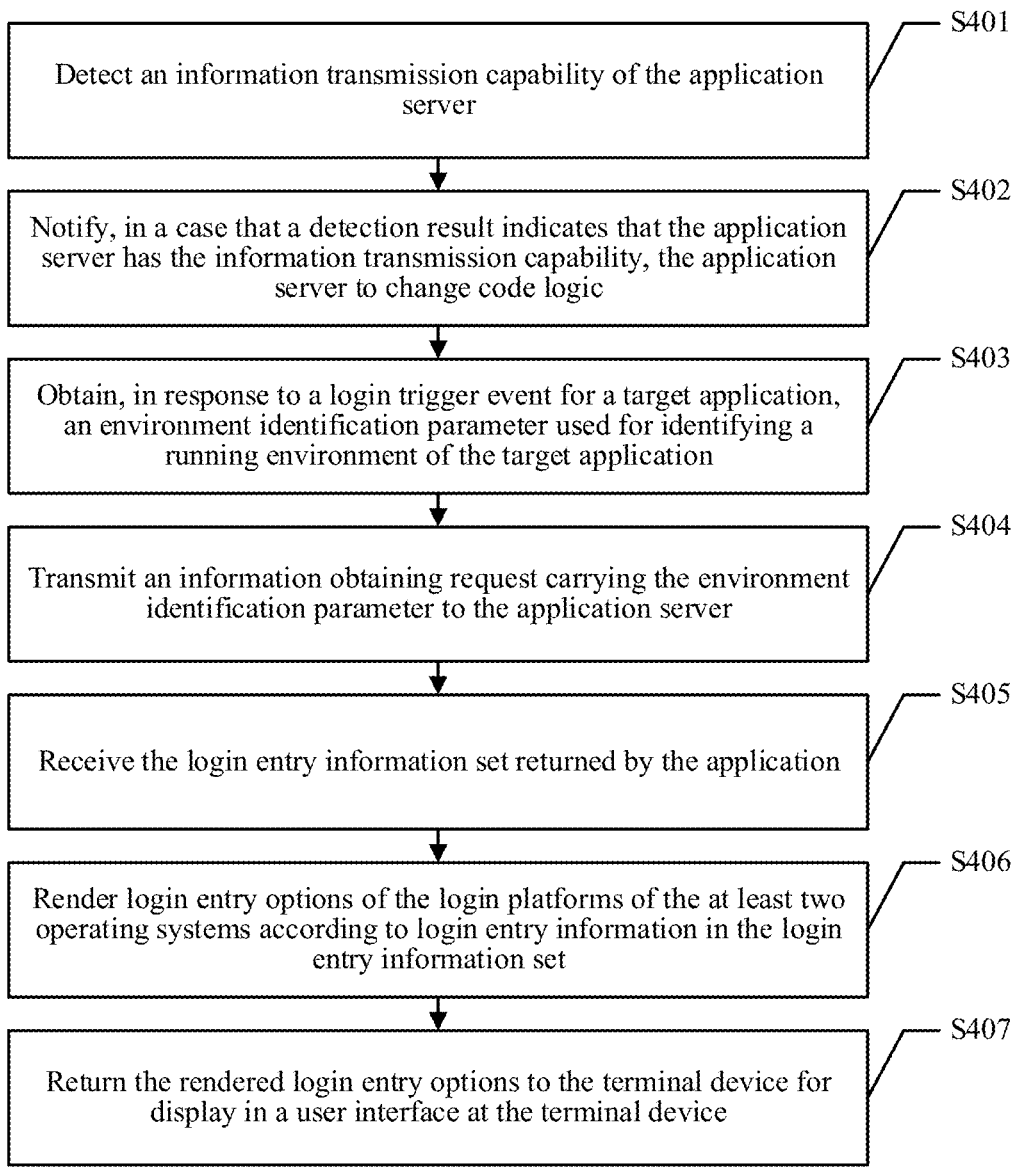
FIG. 4 is a schematic flowchart of a data processing method according to another embodiment of this application.

FIG. 4 is a schematic flowchart of another data processing method according to an embodiment of this application. The data processing method may be performed by the above computer device. When a target application is a non-cloud game application, the computer device is a terminal device, for example, the terminal device of the game client 12 in FIG. 1A, FIG. 1B, and FIG. 1C. When the target application is a cloud game application, the computer device may be, for example, the edge server 11 in FIG. 1A, FIG. 1B, and FIG. 1C. In this embodiment of this application, a manner of obtaining a login entry information set by modifying code logic of an application server is mainly used as an example for description. Referring to FIG. 4, the data processing method may include the following steps S401 to S407.

S401. Detect an information transmission capability of the application server.

In this embodiment of this application, to ensure that the application server may simultaneously return login entry information of login platforms of at least two operating systems, the information transmission capability of the application server may be pre-detected, where the information transmission capability herein is used for representing a capability that the application server simultaneously transmits the login entry information of the login platforms of the at least two operating systems. The target application generally transmits an initial network request to the application server through a socket, to cause the application server to return corresponding response information (such as login entry information corresponding to a target operating system) after parsing the initial network request. Therefore, when the information transmission capability of the application server is detected, after it is identified that a running environment of the target application is a target environment according to the environment identification parameter, historical interaction data between the target application and the application server may be captured by a packet capturing tool, and a service address of the application server and a service port corresponding to the application server are obtained from the historical interaction data.

After the information is obtained, the initial network request transmitted by the target application to the application server may be intercepted and modified at a system bottom layer of the target operating system, to change the initial network request related to the target operating system to network requests related to the at least two operating systems, and continuously transmit the changed requests to the application server. In this way, whether the application server has the information transmission capability is determined according to a return result of the application server.

Based on this, a specific implementation of step S401 may be as follows:

First, an environment identification parameter may be obtained, and the environment identification parameter may include at least one of the following: a customized attribute related to the target application, or a system attribute of the target operating system.

Figure 5A:
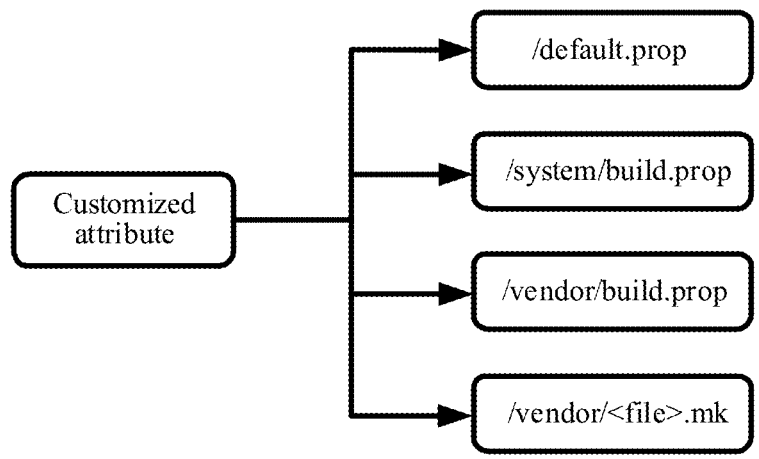
FIG. 5A is a schematic diagram of an attribute file according to an embodiment of this application.

For the customized attribute in the environment identification parameter, the customized attribute of the target application may be pre-added in an attribute file involved in system source code. As shown in FIG. 5A, the attribute file may include any one of the following: a /default.prop file, a /system/build.prop file, a /vendor/build.prop file, a /vendor/<file>.mk file, or the like.

For example, if the target application is set as the cloud game application, and a name of the cloud game application is GameMatrix, a customized attribute of ro.device.gamematrix=1 may be set in the attribute file. In this way, when the customized attribute in the environment identification parameter is obtained, if the attribute file has been compiled and run, the customized attribute may be directly read through an attribute read command. If the attribute file is not compiled and run, the attribute file may be first compiled, and then the customized attribute may be read through an attribute read command.

Figure 5B:
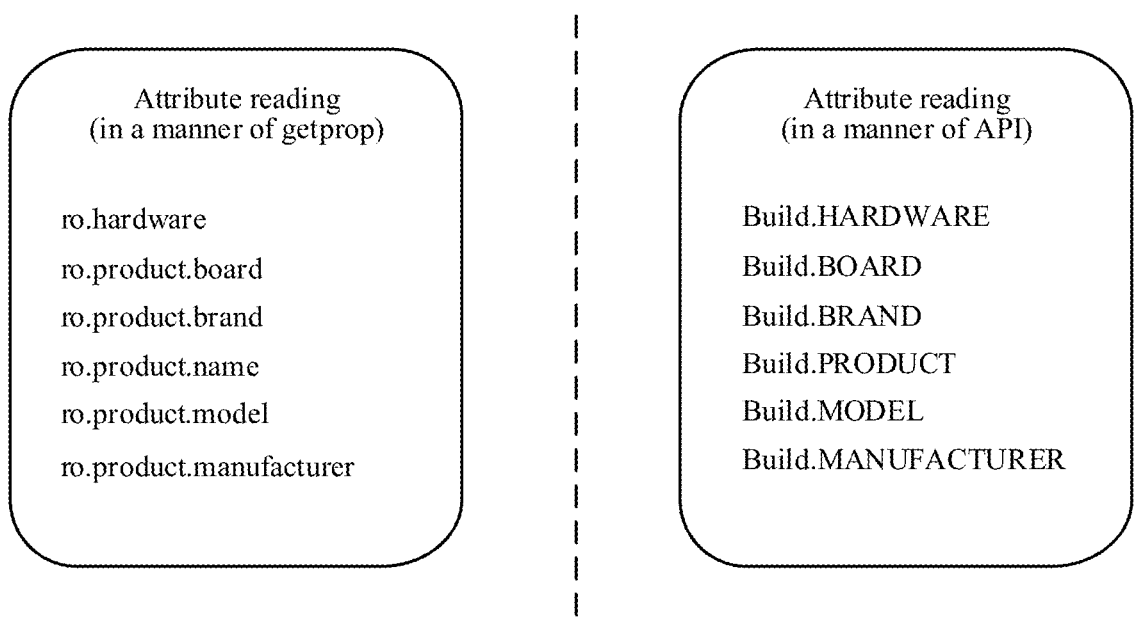
FIG. 5B is a schematic diagram of reading code segments involved in an environment identification parameter according to an embodiment of this application.

The attribute read command is a command used for reading an attribute, such as a getprop command or an adb command in the getprop command. The getprop command may include code segments shown in a left side figure of FIG. 5B.

Similarly, for the system attribute in the environment identification parameter, the system attribute may also be read by invoking an attribute read command. Alternatively, the system attribute is read by invoking a target API, where the target API is an API used for reading an attribute. The target API may include code segments shown in a right side figure of FIG. 5B.

Then, the computer device may identify the running environment of the target application according to the environment identification parameter; intercept, when an identification result indicates that the running environment is the target environment, the initial network request transmitted by the target application to the application server, where the initial network request is used for requesting the application server to return login entry information of a login platform of the target operating system; simultaneously transmit the network requests corresponding to the at least two operating systems to the application server, to request the application server to simultaneously return the login entry information of the login platforms of the at least two operating systems; and determine, when the login entry information of the login platforms of the at least two operating systems is received, that the application server has the information transmission capability.

Figure 5C:
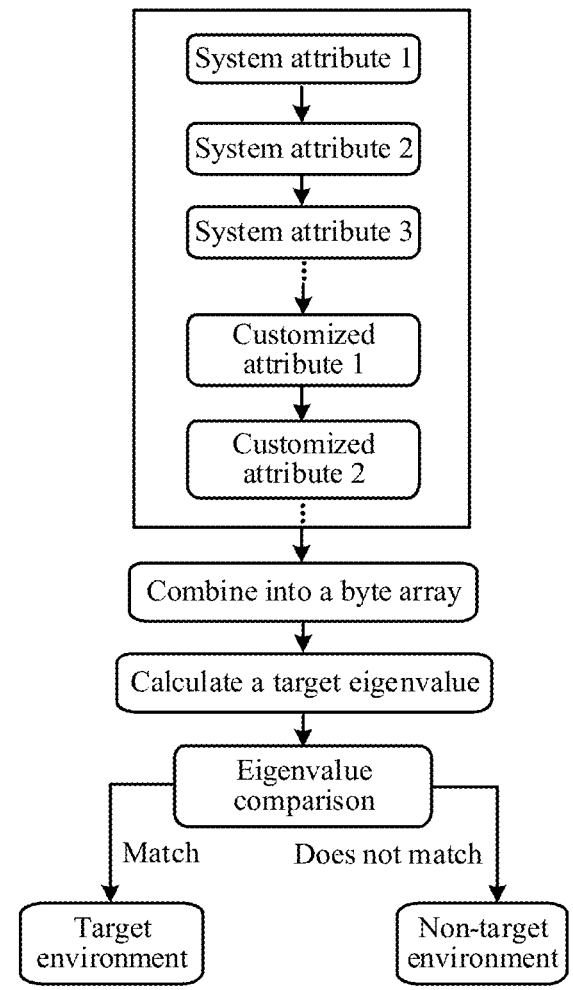
FIG. 5C is a schematic flowchart of an environment identification manner according to an embodiment of this application.

A specific implementation of the identifying the running environment of the target application according to the environment identification parameter is as follows:

First, an eigenvalue operation may be performed on the environment identification parameter, to obtain a target eigenvalue. Specifically, if the environment identification parameter includes the customized attribute or the system attribute, the eigenvalue operation may be directly performed on the customized attribute or the system attribute, to obtain the target eigenvalue. If the environment identification parameter includes the customized attribute and the system attribute, a byte array may be first constructed by using the customized attribute and the system attribute, and then an eigenvalue operation is performed on the byte array, to obtain the target eigenvalue, as shown in FIG. 5C.

The eigenvalue operation includes at least one of the following: a hash operation, a message-digest operation, an attribute obfuscation operation, or an encryption operation. The so-called message-digest operation is an operation performed by using a message-digest algorithm, and the message-digest algorithm may include, but is not limited to: MD5 message-digest algorithm (MD5), MD4, and the like.

The attribute obfuscation operation is an operation of adding another attribute used for obfuscating the customized attribute or the system attribute in the environment identification parameter, or an operation of adding another attribute used for obfuscating the customized attribute or the system attribute in the environment identification parameter and performing compression processing on the added environment identification parameter.

When the eigenvalue operation includes at least two operations, the operations may be successively performed, to improve the security. For example, the encryption operation may be first performed on the byte array, and then the message-digest operation may be performed on a ciphertext obtained through the encryption operation, and the like.

In addition, the computer device may further obtain a reference eigenvalue, where the reference eigenvalue may be stored in a target node in the target operating system, or stored in the application server. The reference eigenvalue is stored in the application server, which can prevent the reference eigenvalue form being maliciously tampered to a certain extent, thereby effectively improving the reliability of the reference eigenvalue. After the reference eigenvalue and the target eigenvalue are obtained, the reference eigenvalue and the target eigenvalue may be compared. When the target eigenvalue matches the reference eigenvalue, it may be determined that the running environment of the target application is the target environment; and when the target eigenvalue does not match the reference eigenvalue, it may be determined that the running environment of the target application is not the target environment.

To improve the convenience of environment identification, identification logic involved in the above step of identifying the running environment of the target application according to the environment identification parameter may be further written into a system software development kit (SDK) and invoked by the target application or the computer device in the form of a jar package or aar package, to implement environment identification.

Moreover, when the environment identification parameter includes the customized attribute and the system attribute, the specific implementation of the identifying the running environment of the target application according to the environment identification parameter may be together shown in FIG. 5C.

Because this implementation identifies the running environment by combining the system attribute and the customized attribute, even if some illegal individuals change an own system attribute by imitating the target operating system so that the modified system attribute is the same as the system attribute of the target operating system, a situation in which a running environment imitated by the illegal individuals is mistakenly identified as the target environment can also be avoided due to a special customized attribute, thereby effectively improving the reliability and accuracy of environment identification.

S402. Notify, when a detection result indicates that the application server has the information transmission capability, the application server to change code logic.

During specific implementation, when the detection result indicates that the application server has the information transmission capability, cooperation and consultation may be performed with a vendor corresponding to the application server. After the consultation is finished, a technical personnel may be notified to change the code logic of the application server. Correspondingly, the application server may change the own code logic in response to a code modification operation of the technical personnel. The changed code logic is used for indicating: returning the login entry information set related to the target application after identifying that the running environment of the target application is the target environment.

S403. Obtain, in response to a login trigger event for a target application at a terminal device, an environment identification parameter used for identifying a running environment of the target application at the terminal device.

S404. Transmit an information obtaining request carrying the environment identification parameter to the application server, to request the application server to identify the running environment of the target application according to the environment identification parameter, and return the login entry information set after an identification result indicates that the running environment is the target environment.

S405. Receive the login entry information set returned by the application server, the login entry information set including the login entry information of the login platforms of the at least two operating systems.

S406. Render login entry options of the login platforms of the at least two operating systems according to login entry information in the login entry information set.

S407. Return the rendered login entry options to the terminal device for display in a user interface at the terminal device.

In this embodiment of this application, an environment identification parameter used for identifying a running environment of a target application may be obtained in response to a login trigger event for the target application; a login entry information set related to the target application may be obtained from an application server according to the environment identification parameter, where the login entry information set includes login entry information of login platforms of at least two operating systems; and then, a user may be provided with login entry options of the login platforms of the at least two operating systems according to login entry information in the login entry information set. In this way, the user can select login entries corresponding to different operating systems for application login according to an own requirement, thereby improving the user viscosity of the target application. Moreover, because this processing manner can realize that an application login operation of the user is not limited by a target operating system of the target application, other users of other operating systems can also be attracted to use the target application, thereby further improving the user viscosity of the target application. In addition, because the login entry information set is obtained after it is identified that the running environment of the target application is a target environment according to the environment identification parameter, the reliability and security of the login entry information set can also be effectively improved.

Figure 6:
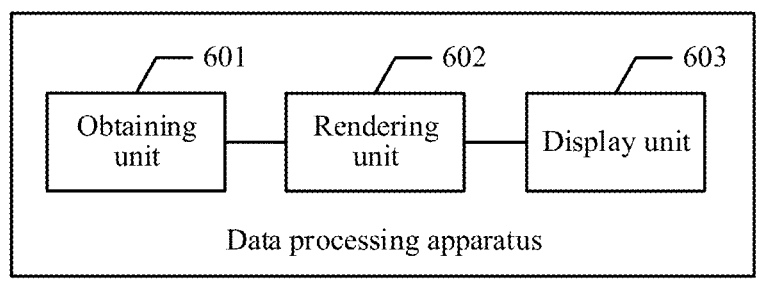
FIG. 6 is a schematic structural diagram of a data processing apparatus according to an embodiment of this application.

Based on the description of the embodiments of the data processing method, an embodiment of this application further discloses a data processing apparatus. The data processing apparatus may be a computer program (including program code) run on the above computer device. The data processing apparatus may perform the method shown in FIG. 2 or FIG. 4. Referring to FIG. 6, the data processing apparatus may run the following units:

an obtaining unit 601, configured to obtain, in response to a login trigger event for a target application at a terminal device, an environment identification parameter used for identifying a running environment of the target application at the terminal device;

the obtaining unit 601, configured to obtain, according to the environment identification parameter, a login entry information set related to the target application from an application server, the login entry information set including login entry information of login platforms of at least two operating systems;

a rendering unit 602, configured to render login entry options of the login platforms of the at least two operating systems according to login entry information in the login entry information set; and a display unit 603, configured to return the rendered login entry options to the terminal device for display in a user interface at the terminal device.

In an implementation, the environment identification parameter includes at least one of the following: a customized attribute related to the target application, or a system attribute of a target operating system, where the target operating system is an operating system on which the target application is installed and run.

In still another implementation, during the obtaining, according to the environment identification parameter, a login entry information set related to the target application from an application server, the obtaining unit 601 may be specifically configured to:

identify the running environment of the target application according to the environment identification parameter;

intercept, when an identification result indicates that the running environment is a target environment, a network login request transmitted by the target application to the application server, where the network login request is used for requesting the application server to return login entry information of a login platform of the target operating system;

simultaneously transmit network requests corresponding to the at least two operating systems to the application server, to request the application server to simultaneously return the login entry information of the login platforms of the at least two operating systems; and receive the login entry information of the login platforms of the at least two operating systems returned by the application server.

In still another implementation, during the obtaining, according to the environment identification parameter, a login entry information set related to the target application from an application server, the obtaining unit 601 may be specifically configured to:

transmit an information obtaining request carrying the environment identification parameter to the application server, to request the application server to identify the running environment of the target application according to the environment identification parameter, and return the login entry information set after an identification result indicates that the running environment is a target environment; and receive the login entry information set returned by the application server.

In still another implementation, before the obtaining, in response to a login trigger event for a target application, an environment identification parameter used for identifying a running environment of the target application, the obtaining unit 601 may be further configured to:

detect an information transmission capability of the application server, where the information transmission capability is used for representing a capability that the application server simultaneously transmits the login entry information of the login platforms of the at least two operating systems; and notify, when a detection result indicates that the application server has the information transmission capability, the application server to change code logic, where the changed code logic is used for indicating: returning the login entry information set after identifying that the running environment of the target application is the target environment.

In still another implementation, during the detecting an information transmission capability of the application server, the obtaining unit 601 may be specifically configured to:

obtain the environment identification parameter, and identifying, according to the environment identification parameter, the running environment of the target application;

intercept, when an identification result indicates that the running environment is the target environment, an initial network request transmitted by the target application to the application server, where the initial network request is used for requesting the application server to return login entry information of a login platform of the target operating system;

simultaneously transmit network requests corresponding to the at least two operating systems to the application server, to request the application server to simultaneously return the login entry information of the login platforms of the at least two operating systems; and determine, when the login entry information of the login platforms of the at least two operating systems is received, that the application server has the information transmission capability.

In still another implementation, during the identifying the running environment of the target application according to the environment identification parameter, the obtaining unit 601 may be specifically configured to:

perform an eigenvalue operation on the environment identification parameter, to obtain a target eigenvalue;

obtain a reference eigenvalue; and determine, when the target eigenvalue matches the reference eigenvalue, that the running environment of the target application is the target environment; and determine, when the target eigenvalue does not match the reference eigenvalue, that the running environment of the target application is not the target environment.

In still another implementation, the reference eigenvalue is stored in a target node in the target operating system, or stored in the application server.

In still another implementation, the environment identification parameter includes the customized attribute and the system attribute; and during the performing an eigenvalue operation on the environment identification parameter, to obtain a target eigenvalue, the obtaining unit 601 may be specifically configured to:

construct a byte array by using the customized attribute and the system attribute; and perform an eigenvalue operation on the byte array, to obtain the target eigenvalue.

In still another implementation, the eigenvalue operation includes at least one of the following: a hash operation, a message-digest operation, an attribute obfuscation operation, or an encryption operation.

In still another implementation, the target application is a cloud game application in a cloud game system, the application server is a game server corresponding to the cloud game application, and the target environment is a cloud game environment;

the cloud game system includes at least one edge server and a plurality of game clients; at least one system container is deployed in each edge server, and each system container is connected to a game client in at least one user terminal; and the each system container is configured to run one or more game applications, and in a process of running any game application, the each system container transmits a game picture of the any game application to the game client to which the system container is connected for display, where the target application runs in a target operating system corresponding to a target container, and the target container is any system container deployed in any edge server in the cloud game system; the login trigger event includes: an event that a game enabling request transmitted by a target game client connected to the target container is received; and the displaying rendered login entry options in a user interface includes: transmitting, through the target container, the rendered login entry options to the target game client, to cause the target game client to display the login entry options in the user interface.

According to an embodiment of this application, the steps involved in the method shown in FIG. 2 or FIG. 4 may be performed by the units of the data processing apparatus shown in FIG. 6. For example, steps S201 and S202 shown in FIG. 2 may be performed by the obtaining unit 601 shown in FIG. 6, step S203 may be performed by the rendering unit 602 shown in FIG. 6, and step S204 may be performed by the display unit shown in FIG. 6. In another example, steps S401 to S405 shown in FIG. 4 may be performed by the obtaining unit 601 shown in FIG. 6, step S406 may be performed by the rendering unit 602 shown in FIG. 6, and step S407 may be performed by the display unit shown in FIG. 6.

According to another embodiment of this application, the units of the data processing apparatus shown in FIG. 6 may be separately or wholly combined into one or several other units, or one (or more) of the units may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by multiple units, or functions of multiple units are implemented by one unit. In another embodiment of this application, the data processing apparatus may also include other units. In an actual application, the functions may also be cooperatively implemented by other units and may be cooperatively implemented by a plurality of units.

According to another embodiment of this application, a computer program (including program code) that can perform the steps in the corresponding method shown in FIG. 2 or FIG. 4 may be run on a general computing device, such as a computer, which includes processing elements and storage elements such as a central processing unit (CPU), a random access memory (RAM), and a read-only memory (ROM), to construct the data processing apparatus shown in FIG. 6 and implement the data processing method in the embodiments of this application. The computer program may be recorded in, for example, a computer readable recording medium, and may be loaded into the foregoing computing device by using the computer readable recording medium, and run on the computing device.

In this embodiment of this application, an environment identification parameter used for identifying a running environment of a target application may be obtained in response to a login trigger event for the target application; a login entry information set related to the target application may be obtained from an application server according to the environment identification parameter, where the login entry information set includes login entry information of login platforms of at least two operating systems; and then, a user may be provided with login entry options of the login platforms of the at least two operating systems according to login entry information in the login entry information set. In this way, the user can select login entries corresponding to different operating systems for application login according to an own requirement, thereby improving the user viscosity of the target application. Moreover, because this processing manner can realize that an application login operation of the user is not limited by a target operating system of the target application, other users of other operating systems can also be attracted to use the target application, thereby further improving the user viscosity of the target application. In addition, because the login entry information set is obtained after it is identified that the running environment of the target application is a target environment according to the environment identification parameter, the reliability and security of the login entry information set can also be effectively improved.

Figure 7:
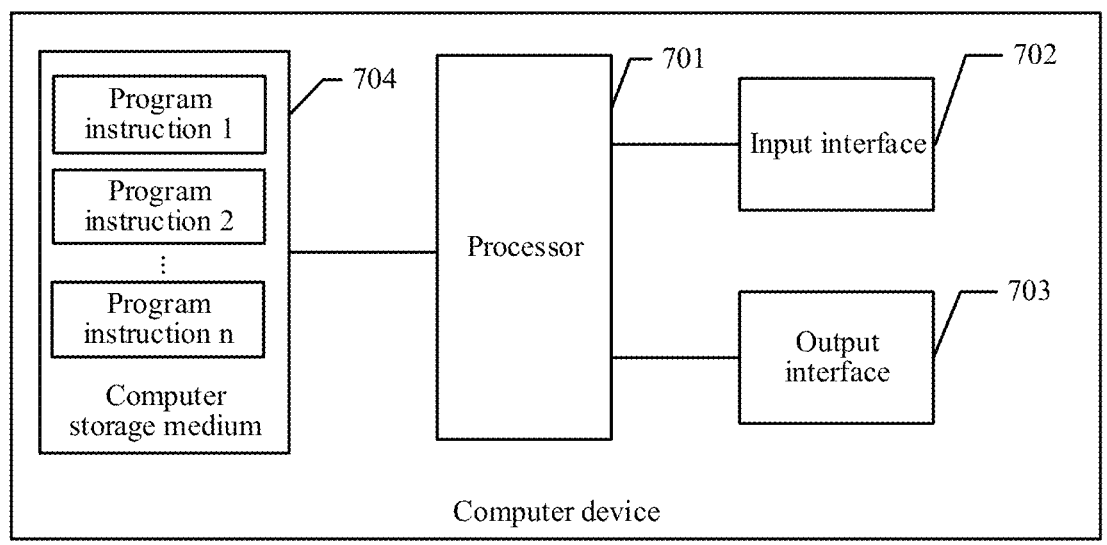
FIG. 7 is a schematic structural diagram of a computer device according to an embodiment of this application.

Based on the descriptions of the foregoing method embodiments and apparatus embodiments, an embodiment of this application further provides a computer device. Referring to FIG. 7, the computer device includes at least a processor 701, an input interface 702, an output interface 703, and a computer storage medium 704. The processor 701, the input interface 702, the output interface 703, and the computer storage medium 704 in the computer device may be connected by using a bus or in another manner.

The computer storage medium 704 may be stored in a memory of the computer device. The computer storage medium 704 is configured to store a computer program. The computer program includes program instructions. The processor 701 is configured to execute the program instructions stored in the computer storage medium 704. The processor 701 (or referred to as a central processing unit (CPU)) is a computing core and a control core of the computer device, is adapted to implement one or more instructions, and is specifically adapted to load and execute the one or more instructions to implement a corresponding method procedure or a corresponding function.

In an embodiment, the processor 701 in this embodiment of this application may be configured to implement a series of data processing, specifically including: obtaining, in response to a login trigger event for a target application, an environment identification parameter used for identifying a running environment of the target application; obtaining, according to the environment identification parameter, a login entry information set related to the target application from an application server, the login entry information set including login entry information of login platforms of at least two operating systems; rendering login entry options of the login platforms of the at least two operating systems according to login entry information in the login entry information set; and displaying rendered login entry options in a user interface, and the like.

An embodiment of this application further provides a computer storage medium, and the computer storage medium is a memory device in a computer device and is configured to store programs and data. It may be understood that the computer storage medium herein may include an internal storage medium of the computer device and certainly may also include an extended storage medium supported by the computer device. The computer storage medium provides storage space, and the storage space stores an operating system of the computer device. In addition, the storage space further stores one or more instructions adapted to be loaded and executed by the processor 701. The instructions may be one or more computer programs (including program code). The computer storage medium herein may be a high-speed RAM memory, or may be a non-volatile memory such as at least one magnetic disk storage. In some embodiments, the computer storage medium may be at least one computer storage medium far away from the foregoing processor.

In another embodiment, the processor 701 may load and execute one or more instructions stored in the computer storage medium, to implement corresponding steps of methods in the above embodiments related to the data processing method. During specific implementation, the one or more instructions in the computer storage medium are loaded by the processor 701 to perform the following steps:

obtaining, in response to a login trigger event for a target application, an environment identification parameter used for identifying a running environment of the target application;

obtaining, according to the environment identification parameter, a login entry information set related to the target application from an application server, the login entry information set including login entry information of login platforms of at least two operating systems;

rendering login entry options of the login platforms of the at least two operating systems according to login entry information in the login entry information set; and displaying rendered login entry options in a user interface.

In an implementation, the environment identification parameter includes at least one of the following: a customized attribute related to the target application, or a system attribute of a target operating system, where the target operating system is an operating system on which the target application is installed and run.

In still another implementation, during the obtaining, according to the environment identification parameter, a login entry information set related to the target application from an application server, the one or more instructions may be loaded by the processor 701 to perform the following steps:

identifying the running environment of the target application according to the environment identification parameter;

intercepting, when an identification result indicates that the running environment is a target environment, a network login request transmitted by the target application to the application server, where the network login request is used for requesting the application server to return login entry information of a login platform of the target operating system;

simultaneously transmitting network requests corresponding to the at least two operating systems to the application server, to request the application server to simultaneously return the login entry information of the login platforms of the at least two operating systems; and receiving the login entry information of the login platforms of the at least two operating systems returned by the application server.

In still another implementation, during the obtaining, according to the environment identification parameter, a login entry information set related to the target application from an application server, the one or more instructions may be loaded by the processor 701 to perform the following steps:

transmitting an information obtaining request carrying the environment identification parameter to the application server, to request the application server to identify the running environment of the target application according to the environment identification parameter, and return the login entry information set after an identification result indicates that the running environment is a target environment; and receiving the login entry information set returned by the application server.

In still another implementation, before the obtaining, in response to a login trigger event for a target application, an environment identification parameter used for identifying a running environment of the target application, the one or more instructions may be further loaded by the processor 701 to perform the following steps:

detecting an information transmission capability of the application server, where the information transmission capability is used for representing a capability that the application server simultaneously transmits the login entry information of the login platforms of the at least two operating systems; and notifying, when a detection result indicates that the application server has the information transmission capability, the application server to change code logic, where the changed code logic is used for indicating: returning the login entry information set after identifying that the running environment of the target application is the target environment.

In still another implementation, during the detecting an information transmission capability of the application server, the one or more instructions may be further loaded by the processor 701 to perform the following steps:

obtaining the environment identification parameter, and identifying, according to the environment identification parameter, the running environment of the target application;

intercepting, when an identification result indicates that the running environment is the target environment, an initial network request transmitted by the target application to the application server, where the initial network request is used for requesting the application server to return login entry information of a login platform of the target operating system;

simultaneously transmitting network requests corresponding to the at least two operating systems to the application server, to request the application server to simultaneously return the login entry information of the login platforms of the at least two operating systems; and determining, when the login entry information of the login platforms of the at least two operating systems is received, that the application server has the information transmission capability.

In still another implementation, during the identifying the running environment of the target application according to the environment identification parameter, the one or more instructions may be loaded by the processor 701 to perform the following steps:

performing an eigenvalue operation on the environment identification parameter, to obtain a target eigenvalue;

obtaining a reference eigenvalue; and determining, when the target eigenvalue matches the reference eigenvalue, that the running environment of the target application is the target environment; and determining, when the target eigenvalue does not match the reference eigenvalue, that the running environment of the target application is not the target environment.

In still another implementation, the reference eigenvalue is stored in a target node in the target operating system, or stored in the application server.

In still another implementation, the environment identification parameter includes the customized attribute and the system attribute; and during the performing an eigenvalue operation on the environment identification parameter, to obtain a target eigenvalue, the one or more instructions may be loaded by the processor 701 to perform the following steps:

constructing a byte array by using the customized attribute and the system attribute; and performing an eigenvalue operation byte array, to obtain the target eigenvalue.

In still another implementation, the eigenvalue operation includes at least one of the following: a hash operation, a message-digest operation, an attribute obfuscation operation, or an encryption operation.

In still another implementation, the target application is a cloud game application in a cloud game system, the application server is a game server corresponding to the cloud game application, and the target environment is a cloud game environment;

the cloud game system includes at least one edge server and a plurality of game clients; at least one system container is deployed in each edge server, and each system container is connected to a game client in at least one user terminal; and the each system container is configured to run one or more game applications, and in a process of running any game application, the each system container transmits a game picture of the any game application to the game client to which the system container is connected for display, where the target application runs in a target operating system corresponding to a target container, and the target container is any system container deployed in any edge server in the cloud game system; the login trigger event includes: an event that a game enabling request transmitted by a target game client connected to the target container is received; and the displaying rendered login entry options in a user interface includes: transmitting, through the target container, the rendered login entry options to the target game client, to cause the target game client to display the login entry options in the user interface.

In this embodiment of this application, an environment identification parameter used for identifying a running environment of a target application may be obtained in response to a login trigger event for the target application; a login entry information set related to the target application may be obtained from an application server according to the environment identification parameter, where the login entry information set includes login entry information of login platforms of at least two operating systems; and then, a user may be provided with login entry options of the login platforms of the at least two operating systems according to login entry information in the login entry information set. In this way, the user can select login entries corresponding to different operating systems for application login according to an own requirement, thereby improving the user viscosity of the target application. Moreover, because this processing manner can realize that an application login operation of the user is not limited by a target operating system of the target application, other users of other operating systems can also be attracted to use the target application, thereby further improving the user viscosity of the target application. In addition, because the login entry information set is obtained after it is identified that the running environment of the target application is a target environment according to the environment identification parameter, the reliability and security of the login entry information set can also be effectively improved.

According to an aspect of this application, a computer program product or a computer program is further provided, the computer program product or the computer program including computer instructions, the computer instructions being stored in a computer-readable storage medium. A processor of a computer device reads the computer instructions from the computer-readable storage medium, and the processor executes the computer instructions, to cause the computer device to perform the method provided in the various implementations of the embodiment aspects of the data processing method shown in FIG. 2 or FIG. 4.

It is to be understood that, the description disclosed above is merely exemplary embodiments of this application, and certainly is not intended to limit the scope of the claims of this application. Therefore, equivalent variations made according to the claims of this application shall fall within the scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A data processing method, performed by a computer device, the method comprising:

obtaining, in response to a login trigger event for a target application at a terminal device, an environment identification parameter used for identifying a running environment of the target application at the terminal device, wherein the environment identification parameter includes a system attribute of a target operating system running at the terminal device;

transmitting a login entry information obtaining request carrying the environment identification parameter to an application server, wherein the application server is configured to identify the running environment of the target application at the terminal device according to the environment identification parameter and return a login entry information set after an identification result indicates that the running environment is a target environment, wherein the target application is a cloud game application in a cloud game system, the application server is a game server corresponding to the cloud game application, and the target environment is a cloud game environment; the cloud game system comprises at least one edge server and a plurality of game clients; at least one system container is deployed in each edge server and each system container is configured to run one or more game applications, and in a process of running any game application, the each system container transmits a game picture of any game application to a game client to which the system container is connected for display, the target application runs in a target operating system corresponding to a target container, and the target container is any system container deployed in any edge server in the cloud game system; and the login trigger event comprises: an event that a game enabling request transmitted by a target game client connected to the target container is received;

obtaining the login entry information set related to the target application from the application server, the login entry information set comprising login entry information of login platforms of at least two operating systems;

rendering login entry options of the login platforms of the at least two operating systems according to login entry information in the login entry information set; and transmitting, through the target container, the rendered login entry options to the terminal device, to cause the target game client to display the login entry options in a user interface at the terminal device.

2. The method according to claim 1, wherein the obtaining the login entry information set related to the target application from the application server comprises:

identifying the running environment of the target application at the terminal device according to the environment identification parameter;

intercepting, when an identification result indicates that the running environment is a target environment, a network login request transmitted by the target application to the application server, wherein the network login request is used for requesting the application server to return a login entry information set of a login platform of the target operating system;

simultaneously transmitting network requests corresponding to the at least two operating systems to the application server, to request the application server to simultaneously return the login entry information set of the login platforms of the at least two operating systems; and receiving the login entry information set of the login platforms of the at least two operating systems returned by the application server.

3. The method according to claim 1, wherein before the obtaining, in response to a login trigger event for a target application, an environment identification parameter used for identifying a running environment of the target application, the method further comprises:

detecting an information transmission capability of the application server, wherein the information transmission capability is used for representing a capability that the application server simultaneously transmits the login entry information of the login platforms of the at least two operating systems; and notifying, when a detection result indicates that the application server has the information transmission capability, the application server to change code logic, wherein the changed code logic is used for indicating: returning the login entry information set after identifying that the running environment of the target application is the target environment.

4. The method according to claim 3, wherein the detecting an information transmission capability of the application server comprises:

obtaining the environment identification parameter, and identifying, according to the environment identification parameter, the running environment of the target application;

intercepting, when an identification result indicates that the running environment is the target environment, an initial network request transmitted by the target application to the application server, wherein the initial network request is used for requesting the application server to return login entry information of a login platform of the target operating system;

simultaneously transmitting network requests corresponding to the at least two operating systems to the application server, to request the application server to simultaneously return the login entry information of the login platforms of the at least two operating systems; and determining, when the login entry information of the login platforms of the at least two operating systems is received, that the application server has the information transmission capability.

5. The method according to claim 2, wherein the identifying the running environment of the target application according to the environment identification parameter comprises:

performing an eigenvalue operation on the environment identification parameter, to obtain a target eigenvalue;

obtaining a reference eigenvalue; and determining, when the target eigenvalue matches the reference eigenvalue, that the running environment of the target application is the target environment; and determining, when the target eigenvalue does not match the reference eigenvalue, that the running environment of the target application is not the target environment.

6. The method according to claim 5, wherein the reference eigenvalue is stored in a target node in the target operating system, or stored in the application server.

7. The method according to claim 5, wherein the environment identification parameter comprises the customized attribute and the system attribute; and the performing an eigenvalue operation on the environment identification parameter, to obtain a target eigenvalue comprises:
constructing a byte array by using the customized attribute and the system attribute; and
performing an eigenvalue operation on the byte array, to obtain the target eigenvalue.

8. The method according to claim 7, wherein the eigenvalue operation comprises at least one of the following: a hash operation, a message-digest operation, an attribute obfuscation operation, or an encryption operation.

9. A computer device, comprising:
a processor, adapted to implement one or more instructions; and
a computer storage medium, storing one or more instructions, the one or more instructions, when by the processor, causing the computer device to perform a data processing method including:
obtaining, in response to a login trigger event for a target application at a terminal device, an environment identification parameter used for identifying a running environment of the target application at the terminal device, wherein the environment identification parameter includes a system attribute of a target operating system running at the terminal device;
transmitting a login entry information obtaining request carrying the environment identification parameter to an application server, wherein the application server is configured to identify the running environment of the target application at the terminal device according to the environment identification parameter and return a login entry information set after an identification result indicates that the running environment is a target environment, wherein the target application is a cloud game application in a cloud game system, the application server is a game server corresponding to the cloud game application, and the target environment is a cloud game environment; the cloud game system comprises at least one edge server and a plurality of game clients; at least one system container is deployed in each edge server and each system container is configured to run one or more game applications, and in a process of running any game application, the each system container transmits a game picture of any game application to a game client to which the system container is connected for display, the target application runs in a target operating system corresponding to a target container, and the target container is any system container deployed in any edge server in the cloud game system; and the login trigger event comprises: an event that a game enabling request transmitted by a target game client connected to the target container is received;
obtaining the login entry information set related to the target application from the application server, the login entry information set comprising login entry information of login platforms of at least two operating systems;
rendering login entry options of the login platforms of the at least two operating systems according to login entry information in the login entry information set; and
transmitting, through the target container, the rendered login entry options to the terminal device, to cause the target game client to display the login entry options in a user interface at the terminal device.

10. The computer device according to claim 9, wherein the obtaining the login entry information set related to the target application from the application server comprises:
identifying the running environment of the target application at the terminal device according to the environment identification parameter;
intercepting, when an identification result indicates that the running environment is a target environment, a network login request transmitted by the target application to the application server, wherein the network login request is used for requesting the application server to return a login entry information set of a login platform of the target operating system;
simultaneously transmitting network requests corresponding to the at least two operating systems to the application server, to request the application server to simultaneously return the login entry information set of the login platforms of the at least two operating systems; and
receiving the login entry information set of the login platforms of the at least two operating systems returned by the application server.

11. The computer device according to claim 9, wherein before the obtaining, in response to a login trigger event for a target application, an environment identification parameter used for identifying a running environment of the target application, the method further comprises:
detecting an information transmission capability of the application server, wherein the information transmission capability is used for representing a capability that the application server simultaneously transmits the login entry information of the login platforms of the at least two operating systems; and
notifying, when a detection result indicates that the application server has the information transmission capability, the application server to change code logic, wherein the changed code logic is used for indicating: returning the login entry information set after identifying that the running environment of the target application is the target environment.

12. The computer device according to claim 11, wherein the detecting an information transmission capability of the application server comprises:
obtaining the environment identification parameter, and identifying, according to the environment identification parameter, the running environment of the target application;
intercepting, when an identification result indicates that the running environment is the target environment, an initial network request transmitted by the target application to the application server, wherein the initial network request is used for requesting the application server to return login entry information of a login platform of the target operating system;
simultaneously transmitting network requests corresponding to the at least two operating systems to the application server, to request the application server to simultaneously return the login entry information of the login platforms of the at least two operating systems; and determining, when the login entry information of the login platforms of the at least two operating systems is received, that the application server has the information transmission capability.

13. The computer device according to claim 10, wherein the identifying the running environment of the target application according to the environment identification parameter comprises:
performing an eigenvalue operation on the environment identification parameter, to obtain a target eigenvalue;
obtaining a reference eigenvalue; and
determining, when the target eigenvalue matches the reference eigenvalue, that the running environment of the target application is the target environment; and determining, when the target eigenvalue does not match the reference eigenvalue, that the running environment of the target application is not the target environment.

14. The computer device according to claim 9, wherein the target application is a cloud game application in a cloud game system, the application server is a game server corresponding to the cloud game application, and the target environment is a cloud game environment;
the cloud game system comprises at least one edge server and a plurality of game clients; at least one system container is deployed in each edge server, and each system container is connected to a game client in at least one user terminal; and the each system container is configured to run one or more game applications, and in a process of running any game application, the each system container transmits a game picture of the any game application to the game client to which the system container is connected for display, wherein
the target application runs in a target operating system corresponding to a target container, and the target container is any system container deployed in any edge server in the cloud game system;
the login trigger event comprises: an event that a game enabling request transmitted by a target game client connected to the target container is received; and
the displaying rendered login entry options in a user interface comprises: transmitting, through the target container, the rendered login entry options to the target game client, to cause the target game client to display the login entry options in the user interface.

15. A non-transitory computer storage medium, storing one or more instructions, the one or more instructions, when by a processor of a computer device, causing the computer device to perform a data processing method including:
obtaining, in response to a login trigger event for a target application at a terminal device, an environment identification parameter used for identifying a running environment of the target application at the terminal device, wherein the environment identification parameter includes a system attribute of a target operating system running at the terminal device;
transmitting a login entry information obtaining request carrying the environment identification parameter to an application server, wherein the application server is configured to identify the running environment of the target application at the terminal device according to the environment identification parameter and return a login entry information set after an identification result indicates that the running environment is a target environment, wherein the target application is a cloud game application in a cloud game system, the application server is a game server corresponding to the cloud game application, and the target environment is a cloud game environment; the cloud game system comprises at least one edge server and a plurality of game clients; at least one system container is deployed in each edge server and each system container is configured to run one or more game applications, and in a process of running any game application, the each system container transmits a game picture of any game application to a game client to which the system container is connected for display, the target application runs in a target operating system corresponding to a target container, and the target container is any system container deployed in any edge server in the cloud game system; and the login trigger event comprises: an event that a game enabling request transmitted by a target game client connected to the target container is received;
obtaining the login entry information set related to the target application from the application server, the login entry information set comprising login entry information of login platforms of at least two operating systems;
rendering login entry options of the login platforms of the at least two operating systems according to login entry information in the login entry information set; and
transmitting, through the target container, the rendered login entry options to the terminal device, to cause the target game client to display the login entry options in a user interface at the terminal device.

16. The non-transitory computer storage medium according to claim 15, wherein the obtaining the login entry information set related to the target application from the application server comprises:
identifying the running environment of the target application at the terminal device according to the environment identification parameter;
intercepting, when an identification result indicates that the running environment is a target environment, a network login request transmitted by the target application to the application server, wherein the network login request is used for requesting the application server to return a login entry information set of a login platform of the target operating system;
simultaneously transmitting network requests corresponding to the at least two operating systems to the application server, to request the application server to simultaneously return the login entry information set of the login platforms of the at least two operating systems; and
receiving the login entry information set of the login platforms of the at least two operating systems returned by the application server.

17. The non-transitory computer storage medium according to claim 15, wherein before the obtaining, in response to a login trigger event for a target application, an environment identification parameter used for identifying a running environment of the target application, the method further comprises:
detecting an information transmission capability of the application server, wherein the information transmission capability is used for representing a capability that the application server simultaneously transmits the login entry information of the login platforms of the at least two operating systems; and
notifying, when a detection result indicates that the application server has the information transmission capability, the application server to change code logic, wherein the changed code logic is used for indicating: returning the login entry information set after identifying that the running environment of the target application is the target environment.

18. The non-transitory computer storage medium according to claim 17, wherein the detecting an information transmission capability of the application server comprises:
obtaining the environment identification parameter, and identifying, according to the environment identification parameter, the running environment of the target application;
intercepting, when an identification result indicates that the running environment is the target environment, an initial network request transmitted by the target application to the application server, wherein the initial network request is used for requesting the application server to return login entry information of a login platform of the target operating system;
simultaneously transmitting network requests corresponding to the at least two operating systems to the application server, to request the application server to simultaneously return the login entry information of the login platforms of the at least two operating systems; and
determining, when the login entry information of the login platforms of the at least two operating systems is received, that the application server has the information transmission capability.

19. The non-transitory computer storage medium according to claim 15, wherein the target application is a cloud game application in a cloud game system, the application server is a game server corresponding to the cloud game application, and the target environment is a cloud game environment;
the cloud game system comprises at least one edge server and a plurality of game clients; at least one system container is deployed in each edge server, and each system container is connected to a game client in at least one user terminal; and the each system container is configured to run one or more game applications, and in a process of running any game application, the each system container transmits a game picture of the any game application to the game client to which the system container is connected for display, wherein
the target application runs in a target operating system corresponding to a target container, and the target container is any system container deployed in any edge server in the cloud game system;
the login trigger event comprises: an event that a game enabling request transmitted by a target game client connected to the target container is received; and
the displaying rendered login entry options in a user interface comprises: transmitting, through the target container, the rendered login entry options to the target game client, to cause the target game client to display the login entry options in the user interface.

* * * * *